United States Patent [19]
Stone

[11] Patent Number: 6,041,057
[45] Date of Patent: Mar. 21, 2000

[54] SELF-CONFIGURING ATM NETWORK

[75] Inventor: Geoffrey C. Stone, Malibu, Calif.

[73] Assignee: Xylan Corporation, Calabasas, Calif.

[21] Appl. No.: 08/823,078

[22] Filed: Mar. 24, 1997

[51] Int. Cl.[7] .................................................. H04L 12/28
[52] U.S. Cl. ........................ 370/397; 370/465; 370/255
[58] Field of Search ..................................... 370/397, 399, 370/402, 404, 203, 254, 396, 400, 216, 217, 218, 221, 225, 228, 237, 465, 255, 401

[56] References Cited

U.S. PATENT DOCUMENTS

| | | | |
|---|---|---|---|
| 5,633,869 | 5/1997 | Burnett et al. | 370/410 |
| 5,802,288 | 9/1998 | Dere et al. | 370/254 |
| 5,850,397 | 12/1998 | Raab et al. | 370/400 |
| 5,867,499 | 2/1999 | Yunten | 370/397 |
| 5,872,773 | 2/1999 | Katzela et al. | 370/256 |

*Primary Examiner*—Hassan Kizou
*Assistant Examiner*—Daniel Previl
*Attorney, Agent, or Firm*—Scot A. Reader

[57] ABSTRACT

Methods for configuring, maintaining connectivity in and utilizing an ATM network. Neighboring switches share topology information and enable links to neighboring switches for tag switching. Point-to-point tagged virtual connections are established between switches on the best and next-best paths learned from topology information. Point-to-multipoint tagged virtual connections are established on the spanning tree path. Multiple tag allocation requests are included in a single message to preserve bandwidth. Next-best paths are established to reduce latency in event of link failure. Forwarding operations may be performed in hardware to reduce latency during message forwarding.

30 Claims, 4 Drawing Sheets

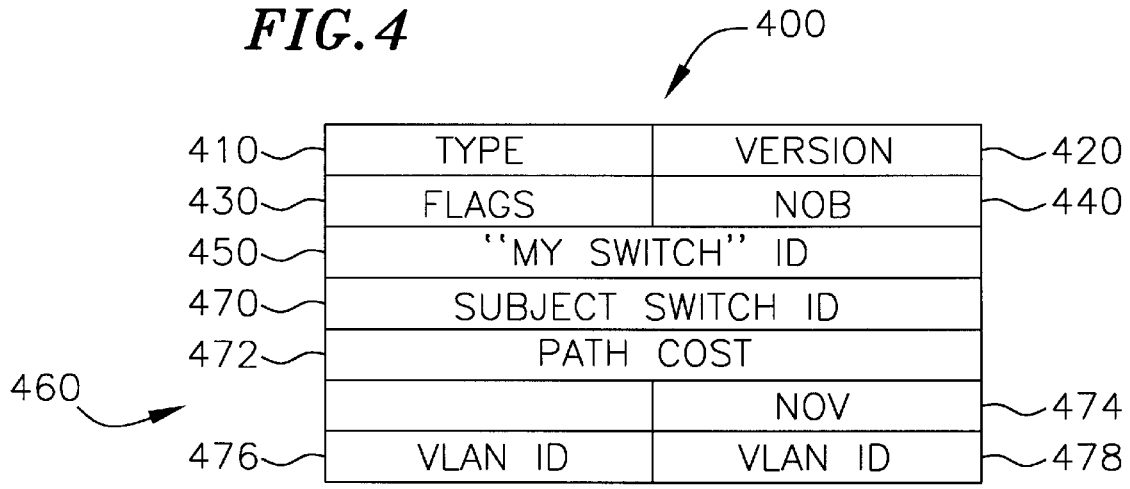
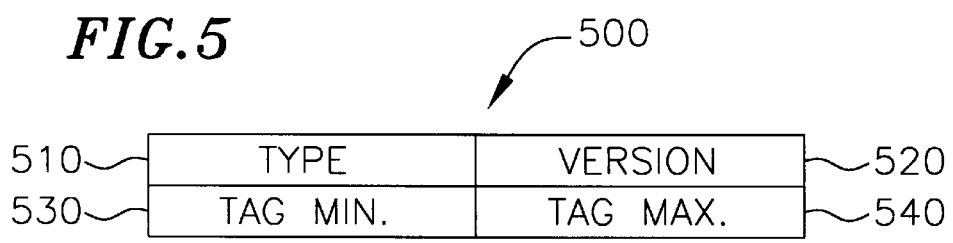
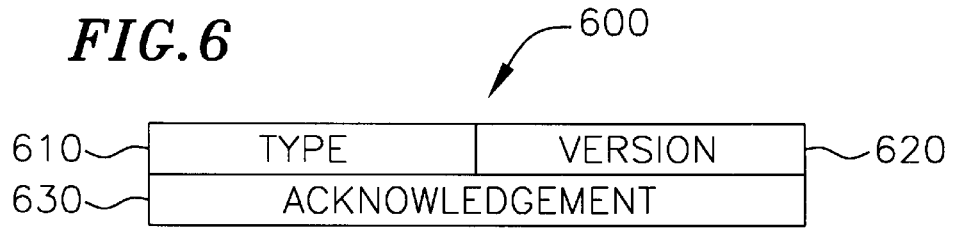

SELF-CONFIGURING ATM NETWORK

FIELD OF THE INVENTION

The present invention relates to data communication networks. More particularly, the present invention relates to methods for configuring, maintaining connectivity in and utilizing an ATM network.

BACKGROUND OF THE INVENTION

A local area network (LAN) segment is a computer sub-network which includes multiple stations in the same physical area communicating by forwarding messages on a shared LAN media. Stations on different LAN segments in the same physical area often communicate through a shared LAN switching fabric, which selectively forwards messages received over the fabric to the destination LAN segment. Stations on different LAN segments in different physical areas, in contrast, often communicate over a backbone network which interconnects multiple LAN switches on the edge of the network. In such an arrangement, each LAN switch selectively forwards messages received over the backbone network to the destination LAN segment.

Communication on LAN segments, and communication between LAN segments over LAN switches, is broadcast-oriented. A station desiring to communicate with another station on the same LAN segment does not need to know where the destination station is located on the segment. Instead, the source station relies on the broadcast capability of the LAN media to propagate all messages to all stations on the segment. An interface on the intended destination station captures the message. Other interfaces on the segment ignore the message. Similarly, if a message propagated on a LAN segment is destined for a station on a different LAN segment associated with the same LAN switch, the LAN switch interconnecting the two segments will typically capture and propagate the message on a switching fabric connecting the two segments. In turn, an interface on the LAN switch associated with the intended destination LAN segment captures and propagates the message on the segment. Other interfaces on the LAN switch ignore the message. Again, there is no requirement that the source station know where the intended destination station resides within the network for successful communication. Rather, communication between the stations on different LAN segments over the LAN switch is "seamless" because the stations can communicate as if they are on the same LAN segment.

In contrast, communication over backbone networks is not always broadcast-oriented. One widely-used backbone technology is asynchronous transfer mode (ATM). Communicating over an ATM network requires that point-to-point or point-to-multipoint virtual connections be established between switches on the edge of the network. Thus, it is necessary for complete connectivity in ATM backbone networks to configure every source switch with virtual connections to every destination switch. Such configuration has generally required either manual configuration by a network administrator or implementation of ATM signaling procedures. Additional configuration has been required to maintain connectivity in the event an established link fails. As a result of these configuration and maintenance requirements, performance of ATM backbone networks has been hindered.

ATM's configuration demands have become even greater with the advent of virtual local area networks (VLANs). A VLAN is an aggregate of LAN segments which are part of the same logical group, but not necessarily the same physical group. By limiting the flow of messages across VLAN boundaries in an ATM network, VLANs can conserve network bandwidth and enhance network security. However, VLANs can at the same time lessen network robustness by requiring configuration of additional overlay virtual connections.

Robustness problems in ATM networks have been further exacerbated by using configuration services which by necessity or design give microprocessors, rather then custom logic, a primary role in message forwarding.

Accordingly, there is a need for more efficient services for configuring and maintaining connectivity in ATM networks.

SUMMARY OF THE INVENTION

It is an object of the present invention to provide an improved ATM network in which virtual connections are self-configuring.

It is another object of the present invention to provide an improved ATM network in which multiple requests for virtual connections can be made in a single message.

It is another object of the present invention to provide an improved ATM network in which a first set of virtual connections are self-configuring along a best path.

It is another object of the present invention to provide improved ATM network in which a second set of virtual connections are self-configuring along a next-best path.

It is another object of the present invention to provide an improved ATM network which can support multiple VLANs.

It is another object of the present invention to provide an improved ATM network in which message forwarding is carried out primarily in custom logic.

These and other objects of the present invention are achieved by methods for configuring and utilizing tagged virtual connections between source and destination switches on the edge of an ATM network.

In one aspect of the invention, neighboring switches share topology information. Topology information includes switch identifying information and path cost information. Switch identifying information includes switch identifiers and VLAN information for particular switches. Path cost information includes information about the relative cost of using particular paths to reach particular switches. Topology information is shared by neighboring switches via topology messages. As a result of topology learning, switches learn about other switches and the most efficient paths for forwarding end-user messages to particular switches.

In another aspect of the invention, neighboring switches enable links for tag switching. Link enablement is requested by forwarding hello requests. Hello requests include a range of tag values proposed for use on a particular link. Link enablement is established by forwarding hello responses. Hello responses include a positive or negative acknowledgment of a hello request. As a result of link enablement, switches learn the available links for use when requesting tagged virtual connections for forwarding end-user messages.

In another aspect of the invention, edge switches and combination switches, as source switches, initiate requests for point-to-point tagged virtual connections to one another, as destination switches. Requests for point-to-point tagged virtual connections are initiated by forwarding a tag allocation request to a neighboring switch along the best path to a destination switch. Tag allocation requests include allocation information, including a source switch identifier, a destination switch identifier and a tag value. Source switches initiate a request for each destination switch for each shared VLAN. Multiple requests may be included in a single tag allocation message to conserve network bandwidth. Transit and combination switches, as neighboring switches, respond to each tag allocation request received by relaying a related tag allocation request to another neighboring switch, if any, along the best path to the destination switch. The relay process is repeated until a tag allocation request arrives at the destination switch. Switches select a different outbound tag value for each requested point-to-point virtual connection so that when an end-user message encoded with a particular tag value is subsequently presented for forwarding, the switch will be able to associate the message with a distinct virtual connection between a particular source and destination switch. As a result of point-to-point tag allocation, a full mesh of point-to-point virtual connections is established for forwarding known unicast end-user messages from source switches to destination switches using a simple look-up operation which resolves identifiers encoded in such messages to outbound ATM ports and outbound tags.

In another aspect of the invention, edge switches and combination switches, as source switches, initiate requests for point-to-multipoint tagged virtual connections to one another, as destination switches. Requests for point-to-multipoint tagged virtual connections are initiated by forwarding a set of tag allocation requests to a set of neighboring switches along the spanning tree path to the set of destination switches sharing a VLAN with a source switch. Tag allocation requests include allocation information, including a source switch identifier, an identifier of the shared VLAN and a tag value. Source switches initiate a request for each shared VLAN. Each point-to-point multipoint tag allocation request is relayed by transit and combination switches, as neighboring switches, until a set of tag allocation requests arrives at the set of destination switches. As a result of point-to-multipoint tag allocation, a full mesh of point-to-multipoint virtual connections is established for forwarding broadcast, multicast and unknown unicast end-user messages from source switches to destination switches sharing a particular VLAN by performing a simple look-up operation using custom logic which resolves identifiers encoded in such messages to outbound ATM ports and outbound tags.

In another aspect of the invention, end-user messages are forwarded from source switches to destination switches on the established point-to-point tagged virtual connections. On source switches, a destination switch identifier associated with an end-user message is resolved to a forwarding ATM port identifier and a first tag value. The message is forwarded over the forwarding ATM port to a neighboring switch. The neighboring switch resolves the first tag value to a forwarding ATM port identifier and second tag value and forwards the message over the forwarding ATM port to a second neighboring switch, if any. The resolution and forwarding process is repeated by additional neighboring switches, if any, until the end-user message arrives at the destination switch. The resolution and forwarding process may be advantageously implemented in custom logic using a table look-up operation.

In another aspect of the invention, end-user messages are forwarded from source switches to destination switches on the established point-to-multipoint tagged virtual connections. On source switches, the VLAN identifier associated with an end-user message is resolved to a set of forwarding ATM port identifiers and a first set of tag values. The message is forwarded over the set of forwarding ATM ports to a set of neighboring switches. The neighboring switches resolve the first set of tag values to a set of forwarding ATM port identifiers and second set of tag values and forward the message over the set of forwarding ATM ports to a second set of neighboring switches, if any. The resolution and forwarding process is repeated by additional neighboring switches, if any, until the end-user message arrives at the set of destination switches belonging to the shared VLAN. The resolution and forwarding process may be advantageously implemented in custom logic using a table look-up operation.

In another aspect of the invention, switches, in addition to initiating and relaying requests for point-to-point virtual connections to destination switches on the best paths, initiate and relay requests for point-to-point virtual connections on the next-best paths. As a result of next-best path tag allocation, if any best path link between a source and destination switch pair becomes disabled, an end-user message can be advantageously diverted to a next-best path to the destination switch.

The present invention can be better understood by reference to the following detailed description, taken in conjunction with the accompanying drawings which are briefly described below. Of course, the actual scope of the invention is defined by the appended claims.

BRIEF DESCRIPTION OF THE DRAWINGS

FIG. 4 shows the general format of a topology message generated by a switch operating in accordance with the present invention;

FIG. 5 shows the general format of a hello request message generated by a switch operating in accordance with the present invention;

FIG. 6 shows the general format of a hello response message generated by a switch operating in accordance with the present invention;

DETAILED DESCRIPTION OF THE PREFERRED EMBODIMENT

Figure 1:
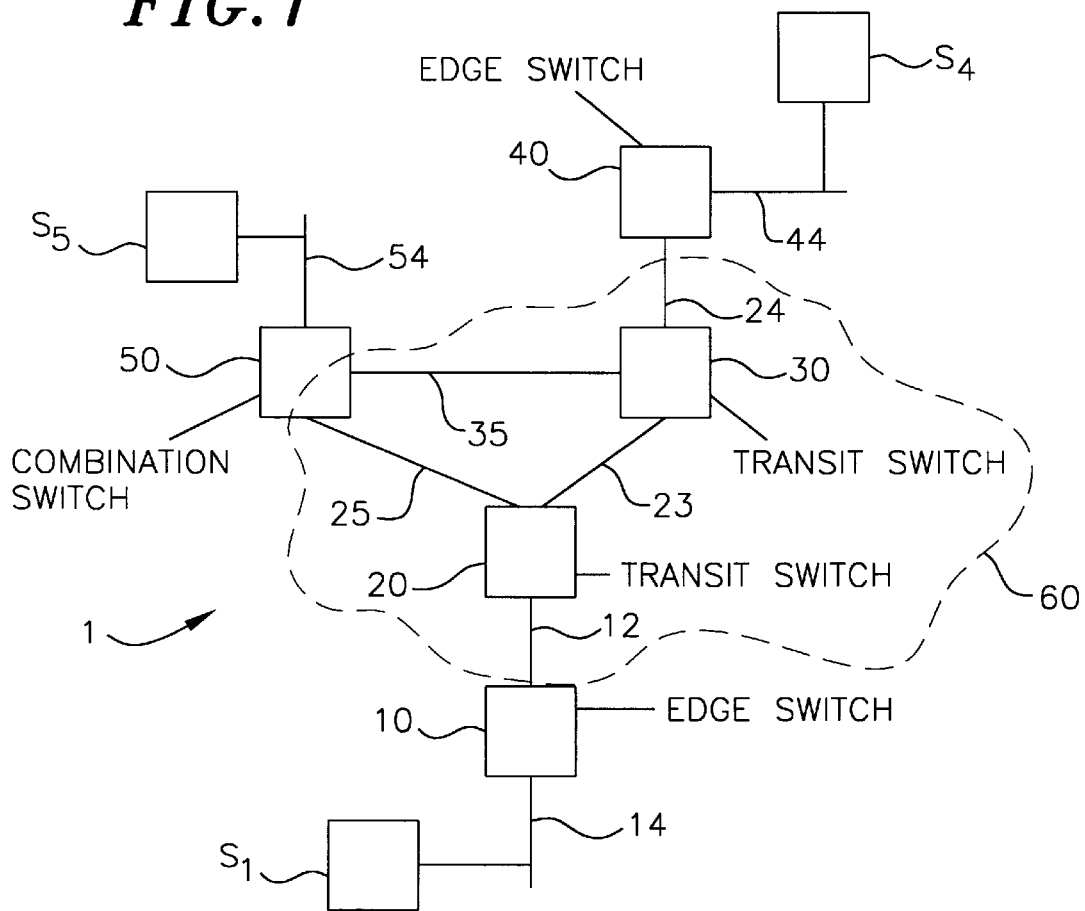
FIG. 1 is a schematic of a communication network operating in accordance with the present invention.
Figure 2:
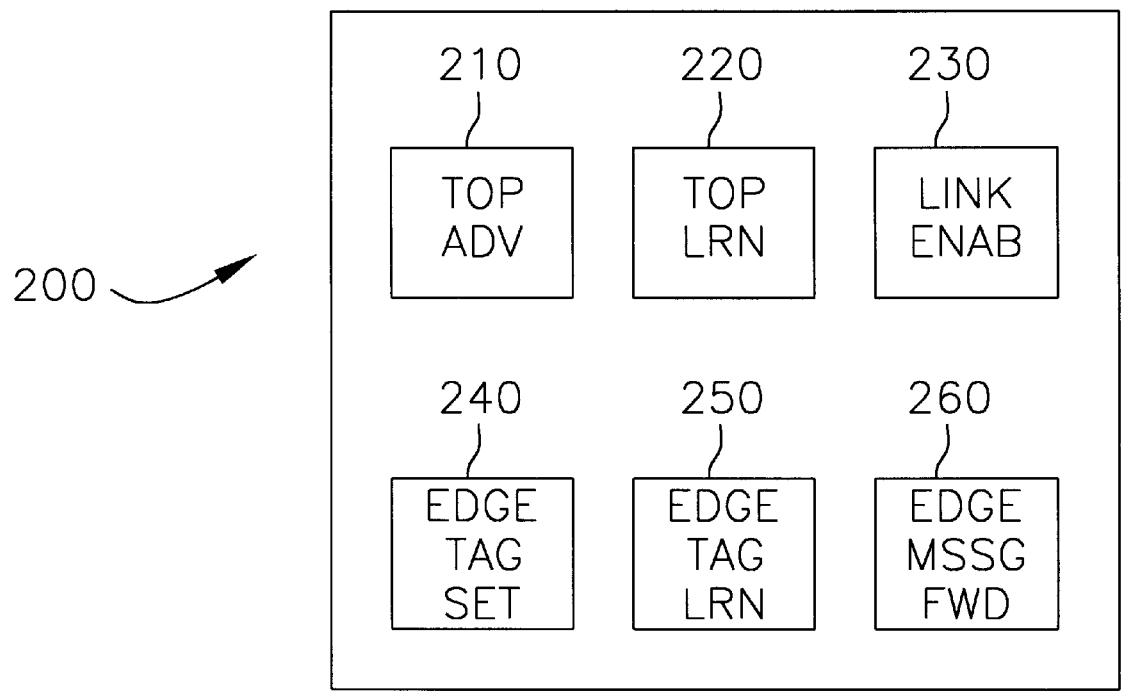
FIG. 2 is a functional diagram of an edge switch operating in accordance with the present invention.
Figure 3:
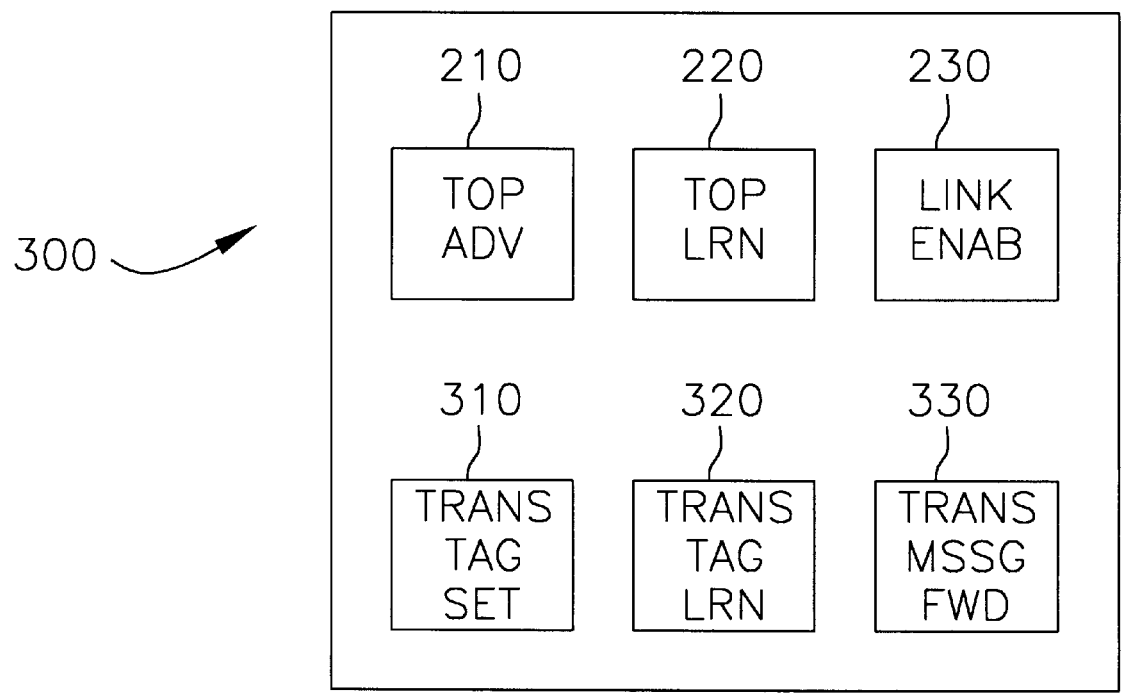
FIG. 3 is a functional diagram of a transit switch operating in accordance with the present invention.

Referring to FIG. 1, a computer network 1 operating in accordance with a preferred embodiment of the present invention is shown. In the illustrated embodiment, network 1 includes stations $S_1$, $S_4$, $S_5$ interconnected to one another over ATM cloud 60. ATM cloud is a connection-oriented medium characterized by switches and ATM links for forwarding information in fixed-length cells in accordance with governing ATM standards. Along the paths interconnecting stations $S_1$, $S_4$, $S_5$ are switches 10, 20, 30, 40, 50. In the illustrated embodiment, network 1 includes edge switches 10, 40, transit switches 20, 30 and combination switch 50. It will be appreciated, however, that a network operating in accordance with the present invention may include two or more edge or combination switches and any number of transit switches interconnected by two or more sets of links. Edge switches are characterized by having one or more ports associated with LAN media, such as Ethernet, Token Ring or FDDI and one or more ports associated with an ATM cloud. In the illustrated embodiment, edge switch 10 has a LAN port associated with LAN segment 14 and station $S_1$. Edge switch 40 has a LAN port associated with LAN segment 44 and station $S_4$. Edge switches 10, 40 also each have a single ATM port to ATM cloud 60. Each edge switch port is associated with one or more VLANs. Transit switches are characterized by having two or more ATM ports associated with an ATM cloud. In the illustrated embodiment, transit switches 20, 30 each have two ports to ATM cloud 60. Combination switches are characterized by having one or more LAN ports associated with LAN media and two or more ATM ports associated with an ATM cloud. In the illustrated embodiment, combination switch 50 is associated with LAN segment 54 and station $S_5$. Combination switch 50 also has two ATM ports to ATM cloud 60. Each combination switch port is associated with one or more VLANs. Switches 10, 20, 30, 40, 50 are each assigned a unique switch identifier and are immediately interconnected to neighboring switches by links 12, 23, 24, 25, 35. Links are preferably fiber optic or twisted pair cables supporting various bandwidths. FIGS. 2 and 3 present functional diagrams of switches operative in accordance with a preferred embodiment of the present invention. The illustrated functionality may be implemented using any suitable logic, although a custom logic implementation is preferred where indicated below.

Referring to FIG. 2, a functional diagram of an edge switch 200 operating in accordance with a preferred embodiment of the present invention is shown. Switch 200 includes TOP ADV means 210. Means 210 serves to advertise network topology information to neighboring switches. Means 210 generates topology messages encoded with associated pairs of switch identifiers, path cost values and VLAN identifiers for switches in the network. Means 210 also periodically forwards topology messages to neighboring switches over active ATM ports of switch 200. Path cost values encoded in topology messages reflect the aggregate cost of the links which must be traversed on a particular path over switch 200 to reach a particular switch. Path costs are added upon receipt of topology messages from neighboring switches. Thus, when switch 200 advertises its own path cost information to a neighboring switch, switch 200 assigns a path cost value of "0". When the neighboring switch advertises the information learned about switch 200, the neighboring switch assigns a path cost for switch 200 based on the bandwidth of the link on which the advertised information was received from switch 200. Topology messages are forwarded periodically on active ATM ports of switch 200.

Switch 200 also includes TOP LRN means 220. Means 220 serves to learn the topology of the network from topology information advertised by other switches. Means 220 assigns a path cost to each link on which topology messages are received, based on the bandwidth of the link. Means 220 further calculates aggregate path cost values by adding the path cost assigned to a link to the path cost value encoded in a topology message received on the link. Means 220 further associates the switch identifier and VLAN identifier in a received topology message with the aggregate path cost value and the identifier of the receiving ATM port and stores the information as an associated pair in a topology database. The topology database may be accessed using known memory access mechanisms.

Switch 200 also includes LINK ENAB means 230. Means 230 serves to determine if a neighboring switch is able to establish tagged virtual connections on a particular link. Means 230 determines from topology information whether a switch is a neighboring switch. Means 230 also associates a neighboring switch with a particular link. Means 230 further establishes a virtual connection to the neighboring switch on the link. Means 230 also forwards on the virtual connection a hello request message encoded with a range of tag values that switch 200 proposes to use when tag switching with the neighboring switch on the link. Means 320 further determines from information encoded in a hello response message received on the link whether the neighboring switch accepts or rejects the request to enable the link for tag switching with switch 200. Switch 200 initiates a hello request message whenever switch 200 learns of a neighboring switch.

Switch 200 also includes EDGE TAG SET means 240. Means 240 serves to initiate requests for tagged point-to-point virtual connections for forwarding known unicast end-user messages. It will be appreciated that a known unicast message is a message encoded with information which switch 200 can resolve to a point-to-point tagged virtual connection to a particular destination switch. Means 240 determines from topology information whether a destination switch shares a VLAN with switch 200. Means 240 also determines from topology information the forwarding ATM port on switch 200 associated with the best path to the destination switch. Means 240 further selects a tag value within the range of values available on the forwarding link. Means 240 further generates a tag allocation message encoded with a tag allocation request. The tag allocation request includes the selected tag value, the identifier of switch 200 and the identifier of the destination switch. Means 240 further forwards the tag allocation message to a neighboring switch on the forwarding link.

Means 240 also serves to initiate requests for point-to-multipoint tagged virtual connections for forwarding broadcast, multicast and unknown unicast end-user messages. It will be appreciated that such messages are messages not encoded with information which switch 200 can resolve to a point-to-point tagged virtual connection to a particular destination switch. A point-to-multipoint tagged virtual connection is requested for each VLAN shared by switch 200. Means 240 determines a set of forwarding ATM ports on switch 200 associated with the spanning tree path to a set of destination switches for a particular VLAN. Means 240 further selects a set of tag values within the range of values available on the set of forwarding links. Means 240 further generates a set of tag allocation messages encoded with a set of tag allocation requests for the set of destination switches. Each tag allocation request includes a selected tag value, the identifier of switch 200 and the identifier of the shared VLAN. Means 240 further forwards the set of tag allocation messages to a set of neighboring switches over the set of forwarding links. The Spanning Tree Protocol (STP) running in accordance with governing IEEE standards is preferably used to determine the spanning tree path.

Means 240 also implements the foregoing procedures to initiate requests for point-to-point tagged virtual connections on the next-best path to destination switches. Means 240 further encodes multiple tag allocation requests in a single tag allocation message. Switch 200 initiates a point-to-point and a point-to-multipoint tag allocation request whenever switch 200 learns of a new VLAN shared by switch 200 and a destination switch.

Edge switch 200 also includes EDGE TAG LRN means 250. Means 250 serves to learn the tag values allocated by switch 200 for the requested tagged virtual connections. Means 250 associates a destination switch identifier with the forwarding ATM port identifier and the tag value encoded in an outbound tag allocation request for a point-to-point virtual circuit and stores the associated pair in a memory means. Means 250 also includes means for associating a set of tag values encoded in a set of outbound tag allocation requests for a point-to-multipoint virtual circuit with a set of forwarding ATM port identifiers and stores the associated pairs in a memory means.

Means 250 also serves to learn the tag values allocated by neighboring switches for the tagged virtual connections for which switch 200 is a destination switch. Means 250 associates a tag value and a source switch identifier in a received point-to-point tag allocation request and stores the associated pair in a receiving database. Means 250 also associating a tag value and a source switch identifier in a received point-to-multipoint tag allocation request and stores the associated pair in a receiving database. Receiving databases may be accessed using known memory access mechanisms. Receiving databases advantageously enable switch 200 to perform a source learning operation on incoming end-user messages by providing switch 200 with information sufficient to resolve source station addresses encoded in such messages to particular source switch identifiers. Means 250 also, upon performing such a source learning operating, associates the learned source station address with a forwarding ATM port identifier and tag value previously stored in association with a particular destination switch identifier. Means 250 further stores the associated station address, forwarding ATM port identifier and tag value as a related pair in a forwarding database. Forwarding database on switch 200 may be accessed using known memory access mechanisms.

Edge switch 200 also includes EDGE MSSG FWD means 260. Means 260 serves to assign tag values to known unicast end-user messages and forward such messages along the established point-to-point tagged virtual connections. Means 260 resolves information encoded in a known unicast end-user message to a forwarding ATM port identifier and a first tag value retrieved from a forwarding database. Means 260 also encodes the message with the first tag value and forwards the message to a neighboring switch on the forwarding link. A look-up operation using custom logic is contemplated for retrieving information from the forwarding database. Custom logic may be implemented in an application-specific integrated circuit (ASIC).

Means 260 also serves to assign tag values to broadcast, multicast, and unknown unicast end-user messages and forward such messages along the established point-to-multipoint tagged virtual connections. Means 260 resolves information encoded in a broadcast, multicast or unknown unicast end-user message to a set of forwarding ATM port identifiers and a set of first tag values retrieved from a memory means. Means also copies the end-user message. Means 260 also encodes the end-user message with the set of tag values and forwards the message to a set of neighboring switches on the set of forwarding links.

Referring to FIG. 3, a functional diagram of a transit switch 300 operating in accordance with a preferred embodiment of the present invention is shown. As with edge switch 200, transit switch 300 has TOP ADV means 210, TOP LRN means 220 and LINK ENAB means 230.

Switch 300 also includes TRANS TAG SET means 310. Means 310 serves to relay requests for point-to-point tagged virtual connections initiated by source switches. Means 310 determines from topology information the forwarding ATM port on switch 300 associated with the best path to a destination switch. Means 310 further selects a tag value within the range of tag values available on the forwarding link. Means 310 further generates a tag allocation message encoded with a tag allocation request. Means 310 further forwards the tag allocation message to a neighboring switch on the forwarding link. Means 310 further implements the foregoing procedures to relay a request initiated by a source switch for a virtual connection on the next-best path to a destination switch. Means 310 further encodes multiple tag allocation requests in a single tag allocation message.

Means 310 also serves to relay requests for point-to-multipoint tagged virtual connections initiated by a source switch. Means 310 determines the set of forwarding ATM ports on switch 300 associated with the spanning tree path to a set of destination switches. Means 310 further selects a set of tag values within the range of values available on a set of forwarding links. Means 310 further generates a set of tag allocation messages encoded with a set of tag allocation requests. Means 310 further forwards the set of tag allocation messages to a set of neighboring switches over the set of forwarding links.

Switch 300 also includes TRANS TAG LRN means 320. Means 320 serves to learn the tag values selected by upstream neighboring switches for the requested tagged point-to-point virtual connections. Means 320 associates a tag value encoded in an inbound tag allocation request with the an identifier of a forwarding ATM port and a tag value selected for encoding in an outbound tag allocation request and stores the associated pair in a forwarding database. Means 320 also serves to learn tag values selected by upstream neighboring switches for requested point-to-multipoint virtual connections. Means 320 associates a tag value encoded in an inbound tag allocation request with an identifier of a set of forwarding ATM ports and a set of tag values selected for encoding in an outbound tag allocation request and stores the associated pair in a forwarding database. Forwarding database on switch 300 may be accessed using known memory access mechanisms.

Switch 300 also includes TRANS MSSG FWD means 330. Means 330 serves to assign tag values to known unicast end-user messages and forward such messages along the established point-to-point virtual connections. Means 330 resolves a tag value encoded in an inbound end-user message to a forwarding ATM port identifier and an outbound tag value retrieved from a forwarding database. Means 330 also encodes an end-user message with the outbound tag value and forwards the message over the forwarding ATM port to a neighboring switch. Means 330 also serves to tag and forward messages along the established point-to-multipoint virtual connections. Means 330 resolves a tag value encoded in an inbound end-user message to a set of outbound ATM port identifiers and a set of outbound tag values retrieved from a forwarding database. Means 330 also encodes a set of end-user messages with the set of outbound tag values and forwards the set of end-user messages to a set of neighboring switches over the set of forwarding links. A look-up operation using custom logic is contemplated for retrieving information from the forwarding database. Custom logic may be implemented in an application-specific integrated circuit (ASIC).

Combination switches combine the functionality of edge switch 200 and transit switch 300 in a single switch. Thus, combination switches include TOP ADV means 210, TOP LRN means 220, LINK ENAB means 230, EDGE TAG SET means 240, EDGE TAG LRN means 250, EDGE MSSG FWD means 360, TRANS TAG SET means 310, TRANS TAG SET means 320 and TRANS MSSG FWD means 330.

Referring to FIG. 4, the general format of a topology message 400 generated in accordance with a preferred embodiment of the present invention is shown. Message 400 includes a type field 410 encoded with a value identifying message 400 as a topology message. Message 400 includes version field 420 encoded with a value indicating the protocol version number of message 400. Different protocol numbers may be used as enhancements are made to the protocol. Message 400 also includes flags field 430 indicating whether message 400 is a flash update message. Flash update messages contain topology information not included in previous topology messages. Message 400 further includes number of blocks (NOB) field 440. NOB field 440 identifies the number of topology information blocks included in message 400. Message 400 also includes "my switch" field 450 encoded with the identifier of the switch which generated the message 400.

Topology information blocks include topology information for a particular switch. One information block is included for each switch known to the switch which generated message 400. Message 400 has first information block 460. Block 460 includes subject switch field 470 encoded with the identifier of the particular switch which is the subject of the information in block 460. Block 460 also has path cost field 472. Path cost field 472 contains a value indicating the cost to reach the subject switch over the path that message 400 was received on. Path costs are assigned to each link based on the bandwidth of the link, with larger values assigned to slower links. In a preferred embodiment, a value of "1" indicates a 100 gigabit per second link, a value of "10" indicates a 10 gigabit per second link, a value of "100" indicates a 1 gigabit per second link, a value of "1000" indicates a 100 megabit per second link, a value of "10000" indicates a 10 megabit per second link, and so on, although it will be appreciated that it is the relationship between the values rather than the actual values which is significant. Block 460 also includes number of VLANs (NOV) field 474. NOV field 474 contains a value indicating the number of VLANs active on the subject switch (and also the number of VLAN fields 476, 478 to follow NOV field 474). VLAN fields 476, 478 each contain an identifier of a VLAN active on the subject switch. It will be appreciated that message 400 may contain additional information blocks for additional switches having the same general format as block 460.

Referring to FIG. 5, the general format of a hello request message 500 generated in accordance with a preferred embodiment of the present invention is shown. Message 500 includes a type field 510 encoded with a value identifying message 500 as a hello request message. Message 500 includes version field 520 encoded with a value indicating the protocol revision number of message 500. Message 500 includes minimum tag value field 530 encoded with the lowest tag value available for use in tag switching on the link on which message 500 is forwarded. Message 500 also includes maximum tag value field 540 encoded with the largest tag value available for use in tag switching on the link on which message 500 is forwarded.

Referring to FIG. 6, the general format of a hello response message 600 generated in accordance with a preferred embodiment of the present invention is shown. Message 600 includes a type field 610 encoded with a value identifying message 600 as a hello response message. Message 600 includes version field 620 encoded with a value indicating the protocol revision number of message 600. Message 600 also includes acknowledgment field 630 encoded with a value indicating whether the switch generated message 600 will enable the link on which message 600 is forwarded for tag switching with the neighboring switch which generated the hello request message to which message 600 is responsive.

Figure 7:
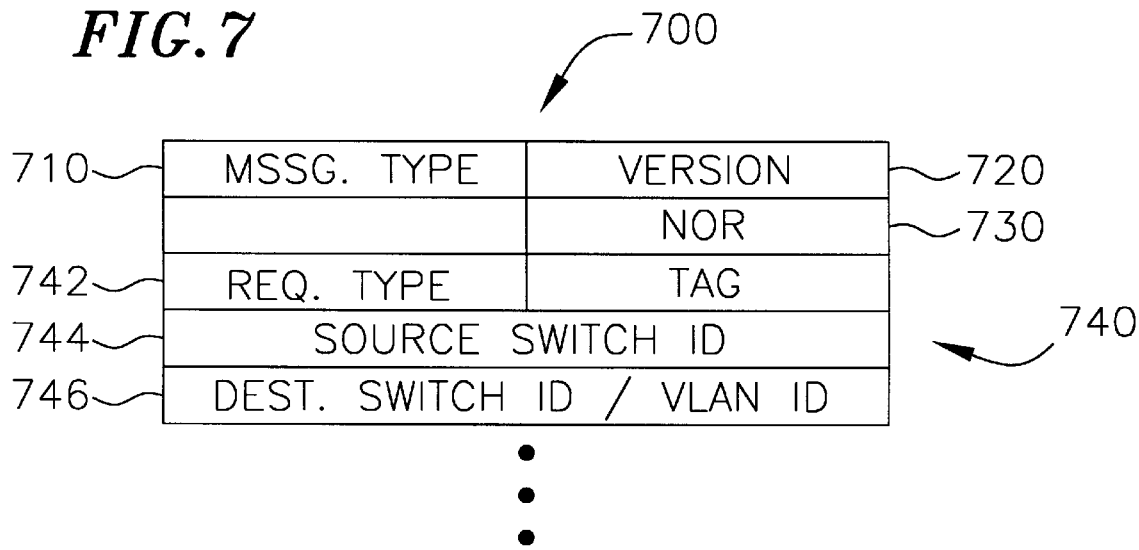
FIG. 7 shows the general format of a tag allocation message generated by a switch operating in accordance with the present invention.

Referring to FIG. 7, the general format of a tag allocation message 700 generated in accordance with a preferred embodiment of the present invention is shown. Message 700 includes type field 710 encoded with a value identifying message 700 as a tag allocation message. Message 700 includes version field 720 encoded with a value indicating the protocol revision number of message 700. Message 700 also has a number of requests (NOR) field 730 encoded with a value indicating the number of tag allocation requests contained in message 700. Message 700 also includes one or more allocation request blocks. First request block 740 contains a type field 742 encoded with a value indicating the requested virtual connection type. Point-to-point and point-to-multipoint are the contemplated types. Request block 740 also includes a source switch field 744. Source switch field 744 is encoded with the identifier of the switch making the tag allocation request contained in the request block 740. Request block 740 also includes destination switch field 746. For requested point-to-point virtual connections, destination switch field 746 is encoded with the identifier of the destination switch. For requested point-to-multipoint virtual connections, field 746 is encoded with the identifier of the shared VLAN. Request block 740 further includes tag field 748. Tag field 748 is encoded with the tag value selected by the switch which generated message 700 for forwarding end-user messages on the requested virtual connection. Message 700 may contain additional request blocks for additional requests having the same general format as block 740.

In a preferred embodiment of the present invention, tag-switched communication over ATM network is accomplished in four steps: topology learning, link enablement, tag allocation and message forwarding.

Returning to FIG. 1, in a preferred topology learning step, switches 10, 20, 30, 40, 50 periodically forward topology messages to neighboring switches on links 12, 23, 24, 25, 35. Topology messages include switch information blocks including switch identifiers, path cost values and VLAN information for particular switches. Neighboring switches associate the information with the receiving link and store the associated pairs in their topology databases. As a result of topology learning, switches 10, 20, 30, 40, 50 learn the identity and VLAN membership and the most efficient paths for forwarding end-user messages to particular switches. The path associated with the lowest path cost to a particular switch over an enabled link is considered the best path to the particular switch. The path associated with the second lowest path cost to a particular switch over an enabled link is considered the next-best path to the particular switch.

In a preferred link enablement step, switches 10, 20, 30, 40, 50 determine if neighboring switches are able to establish tagged virtual connections on the learned paths. Switches 10, 20, 30, 40, 50 forward hello request messages to neighboring switches on links 12, 23, 24, 25, 35. In response to hello request messages, neighboring switches forward hello response messages accepting or rejecting the requests to enable links 12, 23, 24, 25, 35 for tag switching.

In a preferred tag allocation step for point-to-point tagged virtual connections, edge switches 10, 40 and combination switch 50, as source switches, initiate requests for point-to-point virtual connections for forwarding known unicast messages to one another, as destination switches. A point-to-point tagged virtual connection is requested for each source and destination switch pair for each shared VLAN. Each tag allocation request includes the source switch identifier, the destination switch identifier and a first tag value. Each tag allocation request is forwarded to a neighboring transit or combination switch on the best path to the destination switch. The neighboring switch responds by generating a tag allocation request encoded with the source switch identifier, the destination switch identifier, and a second tag value and forwarding the request to a second neighboring switch, if any, on the best path to the destination switch. Similar messages are generated and forwarded by each additional neighboring switch, if any, on the best path, until a tag allocation request is received by the destination switch. Switches along the path of the requested point-to-point virtual connections store the tag allocation information in a memory means. On the source switch, the destination switch identifier, the forwarding ATM port identifier and the first tag value are associated and stored as an associated pair in a memory means. On each neighboring switch, the inbound tag value is associated with a forwarding ATM port identifier and the outbound tag value and stored as an associated pair in a forwarding database. On the destination switch, the source switch identifier, the receiving ATM port identifier and the inbound tag value are stored as an associated pair in a receiving database.

In a more preferred tag allocation step, switches also initiate and relay requests for next-best path virtual connections to destination switches. Switches may be configured to initiate requests for next-best path virtual connections only if they are on the best path to a destination switch from the perspective of the source switch. Alternatively, switches may be configured to initiate requests for next-best path virtual connections if they are on the best or next-best path to the destination switch from the perspective of the neighboring switch from which a tag allocation request is received. Requests for next-best path virtual connections may be initiated concurrently with requests for best-path virtual connections.

In a preferred tag allocation step for point-to-multipoint tagged virtual connections, edge switches 10, 40 and combination switch 50, as source switches, initiate requests for forwarding broadcast, multicast and unknown unicast messages to one another as destination switches. A tagged point-to-multipoint virtual connection is requested for each VLAN shared by the source switch. Each source switch generates a set of tag allocation requests encoded with the identifier of the source switch, the shared VLAN identifier, and a first set of tag values. The set of tag allocation requests is forwarded to a set of neighboring transit or combination switches on the spanning tree path to the set of destination switches belonging to the shared VLAN. The set of neighboring switches responds by generating and forwarding a second set of tag allocation requests encoded with the identifier of the source switch, the shared VLAN identifier, and a second set of tag values. The set of tag allocation requests is forwarded to a second set of neighboring switches, if any, on the spanning tree path to the set of destination switches. Similar messages are generated and forwarded by additional sets of neighboring switches, if any, on the spanning tree path, until a set of tag allocation requests is received by the set of destination switches belonging to the shared VLAN. Switches along the path of the requested point-to-multipoint virtual connections store the tag allocation information in memory. On the source switch, the shared VLAN identifier, the first set of forwarding ATM port identifiers and the first set of tag values are stored as associated pairs in a memory means. On the neighboring switches, the inbound set of tag values encoded in the received tag allocation requests are associated with a set of forwarding ATM port identifiers and an outbound set of tag values and stored as associated pairs in forwarding databases. On the set of destination switches, the shared VLAN identifier, the set of receiving ATM port identifiers and the inbound set of tag values encoded in the set of received tag allocation requests are stored as associated pairs in receiving databases.

In a more preferred tag allocation step, multiple tag allocation requests are encoded in a single tag allocation message.

In a preferred message forwarding step for point-to-point tagged virtual connections, end-user messages are forwarded on the established point-to-point virtual connections. On the source switch, the destination switch identifier associated with an end-user message is resolved to a forwarding ATM port identifier and a first tag value retrieved from a memory means. The message is encoded with the first tag value and forwarded over the forwarding ATM port to a neighboring switch. The neighboring switch retrieves from a forwarding database a forwarding ATM port identifier and second tag value associated with the first tag value. The neighboring switch generates a message encoded with the second tag value and forwards the message over the forwarding ATM port to a second neighboring switch, if any. Similar messages are generated and forwarded by additional neighboring switches, if any, on the best path, until the end-user message arrives at the destination switch.

In a preferred message forwarding step for point-to-multipoint tagged virtual connections, end-user messages are forwarded on the established point-to-multipoint virtual connections. On the source switch, a broadcast, multicast or unknown unicast end-user message to be forwarded to the switches belonging to the shared VLAN is resolved to a first set of forwarding ATM port identifiers and a first set of tag values retrieved from a memory means. Copies of the message are made, as necessary, and encoded with the first set of tag values and forwarded over the first set of forwarding ports to a first set of neighboring switches. The neighboring switches retrieve from a forwarding database a second set of forwarding ATM port identifiers and a second set of tag values associated with the first set of tag values. The neighboring switches generate a second set of messages encoded with the second set of tag values and forward the messages over the second set of forwarding ATM ports to a second set of neighboring switches, if any. Similar messages are generated and forwarded by additional sets of neighboring switches, if any, on the spanning tree path, until the end-user messages arrive at the set of destination switches belonging to the shared VLAN.

It will be appreciated that prior to forwarding messages must be segmented into a series of fixed-length cells in accordance with governing ATM standards.

A preferred message forwarding step may be further illustrated by example by reference to FIG. 1. For simplicity, it will be assumed that a single VLAN is active on all switch ports in network 1. It will also be assumed that links 12, 24, 25 have a bandwidth of 100 megabits per second and that links 23, 35 have a bandwidth of 1 gigabit per second and that all links are enabled. It will further be assumed that stations $S_1$, $S_4$ and $S_5$ have been assigned unique media access control (MAC) addresses $s_1$, $s_4$ and $S_5$, respectively, and that the MAC addresses are only known to the particular switch disposed between the stations and the ATM cloud 60. Thus, addresses $s_1$, $s_4$ are unknown to switch 50, addresses $s_4$, $s_5$ are unknown to switch 10 and addresses $s_1$, $s_5$ are unknown to switch 40.

First, consider an end-user message originating on source station $S_1$ intended for destination station $S_5$. At station $S_1$, the message is encoded with source address $s_1$ and unicast destination address $s_5$ and propagated on LAN segment 14. The message arrives at source switch 10 due to the broadcast nature of LAN segment 14. Source switch 10, however, is unable to resolve address $s_5$ to a point-to-point tagged virtual connection to destination switch 50. Therefore, source switch 10 resolves the message to the point-to-multipoint tagged virtual connection associated with the active VLAN. Accordingly, value $t_v$ associated with the spanning tree path to destination switches 40 and 50 is encoded in the message. The message is segmented into a series of ATM cells and forwarded on forwarding link 12 over the forwarding ATM port on source switch 10.

Upon arrival at neighboring switch 20, the tag value $t_v$ encoded in the message is resolved to tag values $t_v'$ and the forwarding ATM port associated with link 23, which is on the spanning tree path to destination switches 40, 50. The message is encoded with tag value $t_v'$ and forwarded on link 23 to neighboring switch 30.

Upon arrival at neighboring switch 30, the tag value $t_v'$ encoded in the message is resolved to tag values $t_v''$, $t_v'''$ and the forwarding ATM port associated with links 24, 35, which are on the spanning tree path to destination switches 40, 50, respectively. One copy of the message is encoded with tag value $t_v''$ and forwarded on link 24 to destination switch 40. A second copy of message is encoded with tag value $t_v'''$ and forwarded on link 35 to destination switch 50. It will be appreciated that on neighboring switches 20, 30, the tag resolution process can be advantageously carried out by performing a table look-up operation using custom logic.

Upon arrival at destination switch 50, switch 50 performs a source learning operation which associates source station address $s_1$ with source switch 10. The source learning process results in address $s_1$ becoming associated in a forwarding database with a forwarding ATM port identifier and a tag value $t_1$ for a point-to-point tagged virtual connection to switch 10. Switch 50 also determines whether destination address $s_5$ is associated with a LAN segment immediately interconnected to switch 50. Because destination address $s_5$ is associated with LAN segment 54, the message is forwarded on LAN segment 54 and arrives at destination station $S_5$.

Upon arrival at destination switch 40, switch 40 performs a source learning operation which associates source station address $s_1$ with source switch 10. The source learning process results in address $s_1$ becoming associated in a forwarding database with a forwarding ATM port identifier and a tag value $t_1$ for a point-to-point tagged virtual connection to switch 10.

Now consider a reply end-user message originating on source station $S_5$ intended for destination station $S_1$. At station $S_5$, the message is encoded with source address $s_5$ and unicast destination address $s_1$ and propagated on LAN segment 54. The message arrives at source switch 50 due to the broadcast nature of LAN segment 54. Due to the source learning operation performed on the previous end-user message, source switch 50 is able to resolve address $s_1$ to a point-to-point tagged virtual connection to destination switch 10. Accordingly, value $t_1$ associated with the best path to destination switch 10 is encoded in the message. The message is segmented into a series of ATM cells and forwarded on forwarding link 35 over the forwarding ATM port on source switch 50. It will be appreciated that the address resolution process can be carried out on source switch 50 by performing a table look-up operation using custom logic.

Upon arrival at neighboring switch 30, the tag value $t_1$ encoded in the message is resolved to tag values $t_1'$ and the forwarding ATM port associated with link 23, which is on the best path to destination switch 10. The message is encoded with tag value $t_1'$ and forwarded on link 23 to neighboring switch 20.

Upon arrival at neighboring switch 20, the tag value $t_1'$ encoded in the message is resolved to tag value $t_1''$ and the forwarding ATM port associated with link 12, which is on the best path to destination switch 10. The message is encoded with tag value $t_1''$ and forwarded on link 12 to destination switch 10.

Upon arrival at destination switch 10, switch 10 associates source station address $s_5$ with source switch 50. Switch 10 also determines whether the destination address $s_1$ is associated with a LAN segment immediately connected to switch 10. Because the destination address $s_1$ is associated with LAN segment 14, the message is forwarded on LAN segment 14 and arrives at destination station $S_1$. Custom logic look-up operations are contemplated for tag resolution on switches 30, 20, 10.

Now consider how the same reply message reaches destination switch $S_1$ in the event link 35 is disabled. At station $S_5$, the message is encoded with source address $s_5$ and unicast destination address $s_1$ and propagated on LAN segment 54. The message arrives at source switch 50 due to the broadcast nature of LAN segment 54. Due to the source learning operation performed on the previous end-user message, source switch 50 is able to resolve address $s_1$ to a point-to-point tagged virtual connection to destination switch 10. However, since link 35 is disabled, value $t_{lnb}$ associated with the next-best path to destination switch 10 is encoded in the message. The message is segmented into a series of ATM cells and forwarded on forwarding link 25 over the forwarding ATM port on source switch 50.

Upon arrival at neighboring switch 20, the tag value $t_{lnb}$ encoded in the message is resolved to tag value $t_{lnb}'$ and the forwarding ATM port associated with link 12, which is on the next-best path to destination switch 10. The message is encoded with tag value $t_{lnb}'$ and forwarded on link 12 to destination switch 10. Source learning and forwarding on destination switch 10 proceeds in the manner described above.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

I claim:

1. A method for sharing topology information in a self-configuring ATM network, comprising:
   interconnecting n switches, where n is an integer greater than two;
   on a first of said n switches, receiving a first set of topology messages from a set of neighboring switches, said first set of topology messages encoded with related pairs of switch identifiers and path cost information for particular ones of said n switches;
   on said first switch, after receiving said first set of topology messages, generating and forwarding a second set of topology messages to said set of neighboring switches, said second set of topology messages encoded with related pairs of switch identifiers, VLAN information and path cost information for particular ones of said n switches, including at least related pairs of switch identifiers and path cost information for said first switch and said particular ones of said n switches included in said first set of topology messages.

2. The method according to claim 1, wherein said path cost information is computed based on the number of links on particular paths to said particular ones of said n switches and the bandwidth of said links.

3. The method according to claim 1, further comprising means on said first switch for forwarding a hello request message to each of said neighboring switches, said hello request message encoded with a lower and upper tag value.

4. A method for configuring a point-to-point tagged virtual connection in a self-configuring ATM network, comprising:
   (a) interconnecting a switches and a destination switch, where a is an integer greater than one, said a switches including a source switch and b intermediate switches, said b intermediate switches residing in succession on an enabled path between said source switch and said destination switch, where b is a positive integer and where c is initially equal to b minus one;
   (b) on said a switches, determining the dth best path to said destination switch, where d is a positive integer;
   (c) on said source switch, generating and forwarding to a first intermediate switch on the dth best path from said source switch to said destination switch a first tag allocation request including as a related pair an identifier of said destination switch and a first tag value;
   (d) if b is greater than one, on a (b-c)th intermediate switch, upon receiving a (b-c)th tag allocation request, generating and forwarding to a (b-c+1)th intermediate switch on the dth best path from said (b-c)th intermediate switch to said destination switch a (b-c+1)th tag allocation request including said identifier of said destination switch and a (b-c+1)th tag value as a related pair;
   (e) if b is greater than one, subtracting one from c and repeating step (d) unless c equals zero;
   (f) on said bth intermediate switch, generating and forwarding to said destination switch on the dth best path from said bth intermediate switch to said destination switch a (b+1)th tag allocation request including as a related pair said identifier of said destination switch and a (b+1)th tag value.

5. The method according to claim 4, wherein said dth best paths are paths associated with the dth lowest path cost from one of said a switches to said destination switch over a set of enabled links, among e path costs, where e is a positive integer greater than or equal to d, said path costs computed based on the number of links to said destination switch on a particular path and the bandwidth of said links.

6. The method according to claim 4, wherein d is one.

7. The method according to claim 4, wherein d is two when step (c) is performed and is one in all other instances.

8. The method according to claim 4, wherein d is two during one instance when step (d) is performed and is one in all other instances.

9. The method according to claim 4, wherein d is two when step (f) is performed and is one in all other instances.

10. The method according to claim 4, wherein d is either one or two, and may be one or two in any particular instance.

11. The method according to claim 4, wherein each said tag allocation request is encoded in a tag allocation message and at least one of said messages includes multiple requests.

12. The method according to claim 4, further comprising:
   (g) on said source switch, associating said identifier of said destination switch and said first tag value with an identifier of a forwarding ATM port on said source switch; and
   (h) on said source switch, storing said associated information a memory means as a related pair.

13. The method according to claim 4, wherein step (d) further comprises:
   on said (b-c)th intermediate switch, upon receiving said (b-c)th tag allocation request, associating said (b-c)th tag value with an identifier of a forwarding ATM port and said second to said (b-c+1)th tag value; and
   on said (b-c+1)th intermediate switch, storing said associated information in a memory means as a related pair.

14. The method according to claim 4, wherein said (b-c+1)th tag allocation request include an identifier of said source switch, further comprising:
   (i) on said destination switch, associating said identifier of said source switch and said (b+1)th tag value with an identifier of a receiving ATM port; and
   (j) on said destination switch, storing said associated information in a memory means as a related pair.

15. The method according to claim 4, wherein each of said a switches selects a different tag value for each tag allocation request.

16. A method for configuring a point-to-multipoint tagged virtual connection in a self-configuring ATM network, comprising:
   (a) interconnecting a switches and a set of destination switches, where a is an integer greater than one, said a switches including a source switch and b sets of intermediate switches, said b sets of intermediate switches residing in succession on a set of enabled paths between said source switch and said sets of destination switches, where b is a positive integer and where c is initially equal to b minus one, said set of destination switches sharing a VLAN with said source switch;
   (b) on said a switches, determining the spanning tree path to said set of destination switches;
   (c) on said source switch, generating and forwarding to a first set of intermediate switches on the spanning tree path a first set of tag allocation requests including as a related pair an identifier of said shared VLAN and a first set of tag values;
   (d) if b is greater than one, on said (b-c)th set of intermediate switches, upon receiving a (b-c)th set of tag allocation requests, generating and forwarding to a (b-c+1)th set of intermediate switches on the spanning tree path a (b-c+1)th set of tag allocation requests including as related pairs said identifier of said shared VLAN and a (b-c+1)th set of tag values;
   (e) if b is greater than one, subtracting one from c and repeating step (d) unless c equals zero;
   (f) on said bth set of intermediate switches, generating and forwarding to said set of destination switches on the spanning tree path a set of (b+1)th tag allocation requests including as related pairs said identifier of said shared VLAN and a set of (b+1)th tag values.

17. The method according to claim 16, wherein each said tag allocation request is encoded in a tag allocation message and at least one of said messages includes multiple requests.

18. The method according to claim 16, further comprising:
   (g) on said source switch, associating said identifier of said shared VLAN and said first set of tag values with an identifier of a set of forwarding ATM ports on said source switch; and (h) on said source switch, storing said associated information a memory means as a related pair.

19. The method according to claim 16, wherein step (d) further comprises:

on said set of (b-c)th intermediate switches, upon receiving said set of (b-c)th tag allocation requests, associating said set of (b-c)th tag values with a set of identifiers of a set of forwarding ATM ports and said set of (b-c+1)th tag values; and on said set of (b-c+1)th intermediate switches, storing said associated information in a memory means as a related pair.

20. The method according to claim 16, wherein said set of (b-c+1)th tag allocation requests include an identifier of said source switch, further comprising:

(i) on said set of destination switches, associating said identifier of said source switch and said set of (b-c+1)th tag values with a set of identifiers of a set of receiving ATM ports; and (j) on said set of destination switches, storing said associated information a set of memory means as a set of related pairs.

21. The method according to claim 16, wherein each of said a switches selects a different tag value for each tag allocation request.

22. A method for forwarding an end-user message on a point-to-point virtual connection in a self-configuring ATM network, comprising:

(a) interconnecting a switches and a destination switch, where a is an integer greater than one, said a switches including a source switch and b intermediate switches, said b intermediate switches residing in succession on an enabled path between said source switch and said destination switch, where b is a positive integer, and where c is initially equal to b minus one;

(b) on said source switch, receiving said end-user message, said end-user message having a payload and destination information;

(c) on said source switch, resolving said destination information to a forwarding ATM port identifier and a first tag value associated with the dth best path from said source switch to said destination switch, where d is initially one;

(d) on said source switch, encoding said end-user message with said first tag value and forwarding said end-user message to a first intermediate switch on the dth best path from said first intermediate switch to said destination switch;

(e) if b is greater than one, on a (b-c)th intermediate switch, upon receiving said end-user message encoded with a (b-c)th tag value, for encoding said end-user message with a (b-c+1)th tag value and forwarding said end-user message to a (b-c+1)th intermediate switch on the dth best path from said (b-c)th intermediate switch to said destination switch;

(f) if b is greater than one, subtracting one from c and repeating step (e) unless c equals zero;

(g) on said bth intermediate switch, upon receiving said end-user message encoded with a bth tag value, for encoding said end-user message with a (b+1)th tag value and forwarding said message to said destination switch on the dth best path from said bth intermediate switch to said destination switch.

23. The method according to claim 22, wherein d becomes two upon a failed attempt to forward said end-user message on the best path from one of said a switches to said destination switch and reverts to one after a successful forwarding attempt by said particular one of said a switches.

24. The method according to claim 22, wherein said end-user message includes source information, further comprising:

(h) on said destination switch, associating said source information with a tag value for a point-to-point virtual connection to said source switch; and (i) on said destination switch, storing said associated information as a related pair in a memory means.

25. The method according to claim 22, wherein step (c) is carried out using custom logic.

26. The method according to claim 22, wherein said custom logic is an application-specific integrated circuit.

27. The method according to claim 22, wherein step (d) is carried out using custom logic.

28. The method according to claim 22, wherein said custom logic is an application-specific integrated circuit.

29. The method according to claim 22, wherein step (e) is carried out using custom logic.

30. The method according to claim 22, wherein said custom logic is an application-specific integrated circuit.

* * * * *